Figure 1:
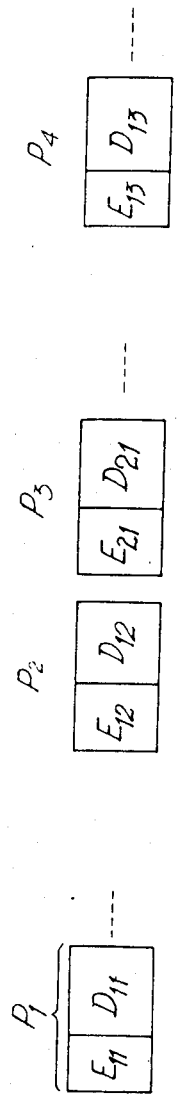

United States Patent [19]

Blineau et al.

[11] Patent Number: 4,688,218
[45] Date of Patent: Aug. 18, 1987

[54] MULTIPLEX CHANNELS FOR CONTINUOUS FLOW FOR NUMERICAL SIGNAL

[75] Inventors: Joseph Blineau, Rennes; Daniel Pommier, Mordelles; Claude Thomas, Chasne sur Illet, all of France

[73] Assignee: Etablissement Public de Diffusion Dit "Telediffusion de France", France

[21] Appl. No.: 570,447

[22] Filed: Jan. 16, 1984

Related U.S. Application Data

[63] Continuation of Ser. No. 283,502, Jul. 15, 1981, abandoned.

[51] Int. Cl.⁴ .............................. H04J 3/06
[52] U.S. Cl. .................... 370/106; 370/94; 358/147
[58] Field of Search .............. 370/106, 94, 99, 100; 358/147, 145, 114

[56] References Cited

U.S. PATENT DOCUMENTS 4,058,830 11/1977 Guinet et al. ............... 358/66
4,205,343 5/1980 Barrett ....................... 358/147
4,337,483 6/1982 Guillou ....................... 358/147
4,414,662 11/1983 Bousquet ..................... 370/100
4,420,833 12/1983 Noirel ........................ 358/147

Primary Examiner—Douglas W. Olms
Attorney, Agent, or Firm—Laff, Whitesel, Conte & Saret

[57] ABSTRACT

A digital data pack transmission system is especially—but not exclusively—useful in videotex or teletext transmission (i.e. videotext or teletext data is transmitted during intervals between segments of video signals). The inventive system uses a continuous transmission carrier. A plurality of data packs are individually included in each block of data which is periodically transmitted. Dummy packs are used to fill the blocks, if less than a full complement of packs is required. The time periods available for the transmission of blocks of data are exactly equal to or a little longer than the maximum length of the transmitted blocks. The beginning of each data block has a synchronization bit pattern which is constituted by a "bit sync" byte followed by a "byte sync" byte. Except for the synchronizing pattern, the signals are scrambled before transmission and descrambled upon receipt and recognition of the data.

9 Claims, 10 Drawing Figures

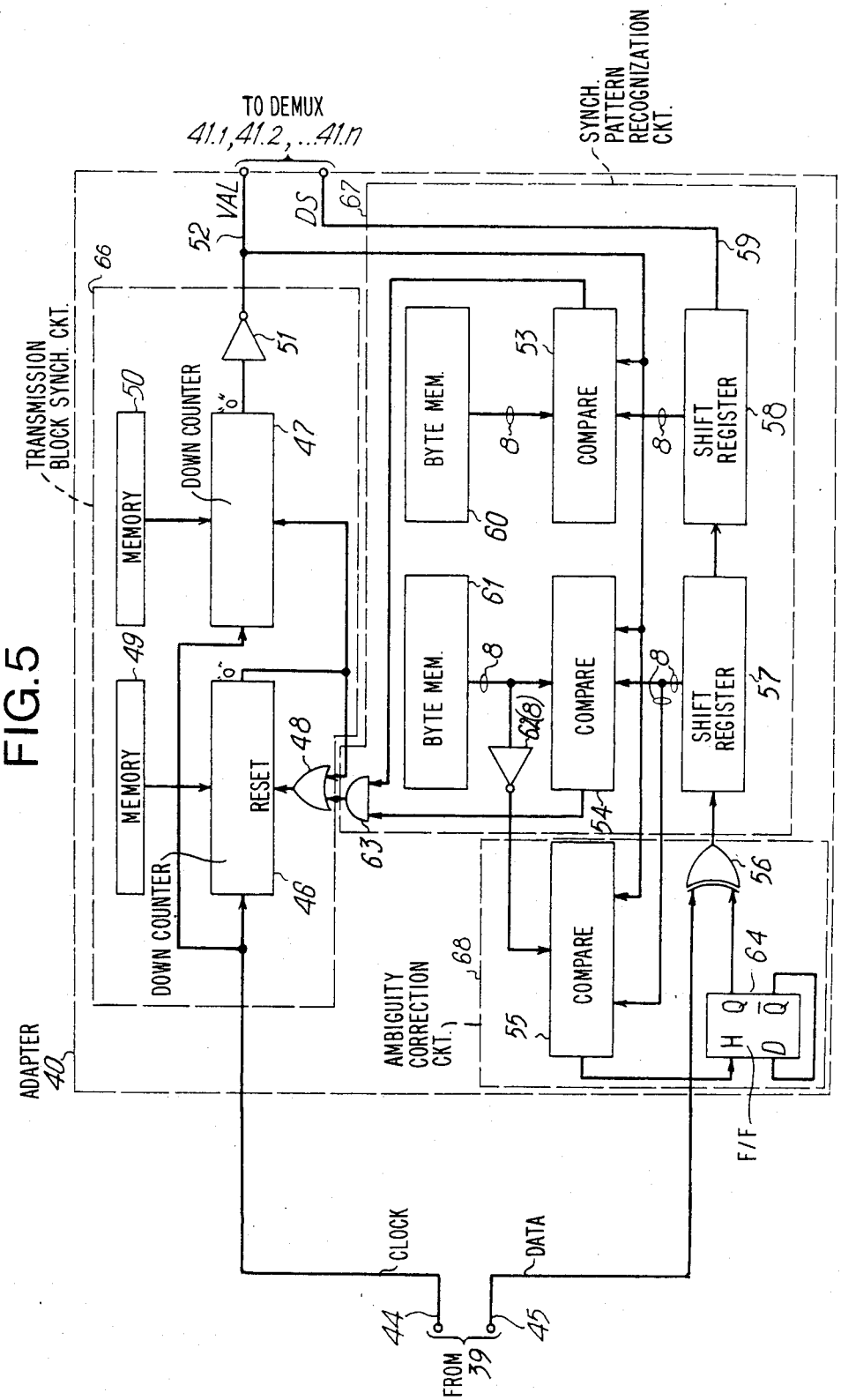

MULTIPLEX CHANNELS FOR CONTINUOUS FLOW FOR NUMERICAL SIGNAL

This is a continuation of U.S. patent application Ser. No. 283,502, filed July 15, 1981, now abandoned.

The present invention relates to a digital data multiplex system for digital data to be transmitted or broadcasted through telecommunication satellites and/or ground stations. More generally, the multiplex system may be used with any transmission and/or recording means.

The transmission of digital sound information and the transmission of digital data intended for various services by using either satellite broadcasting means or ground broadcasting networks constitutes a new broadcasting or transmission service the implementation of which should not disturb the operation of existing receiver sets, as long as they have not been replaced totally by new standard receiver sets.

Some of those new services require large capacity channels, particularly with respect to the digital transmission of at least four high monophonic quality "sound" channels, or any other similar combination of high quality stereophonic or monophonic sounds. Other services require lower bit rate channels, particularly for transmitting teletext data, captioning data, telecopier data, etc. Indeed, a 2 Mbit channel must be provided together with a simple flexible procedure for multiplexing the various services using that channel.

As far as such a channel is concerned, two types of structures are well known. First, continuous rate channels are used for transmitting digital network multiplex and more particulaly 2.048 Mbit/s multiplex of level TN1 as defined in the recommendation G732 of the CCITT. Second packet channels are used for teletext or videotex transmission. Those two structures have advantages and drawbacks when applied to broadcasting. Both have a common advantage, in that they have been successfully used and even exploited for several years.

Continuous rate channels, well known in the transmission field, are used for transmitting sound or voiced signals. The capacity of such 2.048 Mbit/s channels is five or six high quality monophnonic channels depending on the utilized coding process. They have two drawbacks. On the one hand, they provide easy multiplexing for signals having rates that multiple of 64 kbit/s. On the other hand, 64 kbit/s is the minimum rate for direct insertion, without need of an additional multiplexing level.

Pack transmission has the following advantages. It is simple to perform. It makes the insertion of asynchronous channels easy. It requires no specific values and more particularly no minimum limit for entering rates. Packet multiplexing being based on transmitted pack identification a, demultiplexing process is performed in a very simple manner in the receivers. Resource sharing is programmable and changeable without imposing requirements in receivers. Demultiplexing and coupling to terminal units may be embodied with integrated circuits.

On the opposite, pack broadcasting has the following drawbacks. At the receiver end, a pack selection process causes pack to be lost in the case of degraded signals, which results in a major degradation of the quality of the service. The loss rate of packs is usually low, as well in satellite broadcasting as ground station broadcasting for usual propagation conditions. However, when a phenomenon occurs, it should not cause a substantial degradation of service. As a result the use of pack multiplexing, for sound broadcasting, limits the useful capacity of a 2.048 Mbit/s channel at the equivalent of four high quality monophonic sounds.

In known continuous carrier data pack transmission systems, data are transmitted to a modulator which inserts specific transmission block start and stop signals, which are used in the demodulator to provide a correct operation. It is possible restore the carrier wave and particularly to regenerate the bit clock. When considering the most usual case of a transparent modulator, those specific start and stop signals are transmitted irrespective of the pack structure of the data flow. Otherwise, those specific start and stop signals may be located within a pack and there may be several packs between two specific signals. In the field, with bad transmission condition, the loss of an entire pack, at the reception end, causes less trouble than pack mutilation causes.

A purpose of the present invention is to provide a transmission system overcoming the above mentioned drawbacks, wherein data packs are periodically transmitted.

Such a system has already been described in the French Pat. No. 2,444,370 wherein each data signal made of packs includes a synchronization signal (SI) followed by a field of data (CD). In that French patent, each field of data (CD) is not a so-called "data pack".

A pack transmission system is also known which serves to broadcast data within a TV channel. Such a system is described particularly in the U.S. Pat. No. 4,058,830.

In the system described in the U.S. Pat. No. 4,058,830, the data pack broadcasting involves a time sharing multiplexing that may be divided into two levels. As shown in FIG. 1 of that patent, there is a multiplexing of the data from a plurality of sources, each source being described by the contents of bytes 4–6, which creates as many data channels as sources.

The packets are inserted in every TV picture line or in some of them only. Of course, TV picture lines carrying digital data are not visible on the TV receiver screen.

Figure 6:
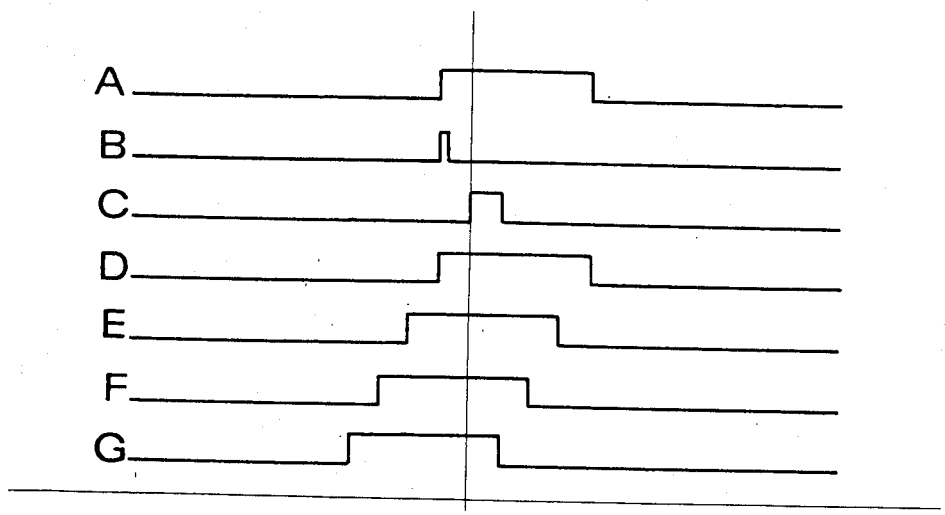

In the system described in FIGS. 1 and 6 of the U.S. Pat. No. 4,058,830, the reception circuits comprise a TV receiver set which delivers, from its video output, video signals to the proper processing equipment, which comprises a demodulator (or demodulation portion 61) and a demultiplexer (or logic portion 62). The demodulator derives the digital multiplex from the video signals and delivers to the demultiplexer the serially arranged digital data DS, correctly phased bit clock HD, and a validation signal VAL indicating to the multiplexer that a data pack is present in the processed TV line. From the prefix information the demultiplexer selects a digital channel, i.e. the desired source, and delivers the useful data to utilization means.

In that known system the beginning of each pack is preceded by the line sync signal of the TV signal. Therefore there is no ambiguity for identitifying the first bytes of each pack.

A purpose of this invention is to provide a transmission system operating with a continuous transmission carrier—contrary to a TV signal that is a pulsed carrier—wherein use is made of a pack organization similar to that described in the U.S. Pat. No. 4,058,830 and a modulation suitable for the transmission carrier.

According to a feature of this invention, a digital data pack transmission system uses a continuous transmission carrier wherein data pack are individually included in transmission blocks which are periodically transmitted, with transmission blocks containing dummy pack if necessary. For instance, transmission may be on a carrier modulated at 2.048 Mbit/s with MSK modulation, the period of the transmission blocks, every I clock pulses, being exactly equal or a little longer than the maximum length of the transmission blocks. The beginning of each transmission block comprises a synchronization pattern constituted by a "bit sync" byte followed by a "byte sync" byte. The above mentioned rate value as well as the modulation type is, of course, given by way of example.

In the system according to this invention, the structure of the transmission blocks is very similar to that of the packs described in the U.S. Pat. No. 4,058,830 so that each receiver equipment also includes a demodulator, for instance, operating with the MSK modulation and delivering the above mentioned signals DS, HD and VAL, and a demultiplexer as described in the U.S. patent. Hereafter in the demodulator consideration will be separately given to the properly demodulating circuits and to the adapter that delivers signals DS, HD and VAL.

The main purpose of the adapter is to detect the synchronization pattern before each pack prefix, such a synchronization pattern being constituted by the "bit sync" byte and the "byte sync" byte, and to deliver the signal VAL to the demultiplexer.

Indeed the synchronization pattern is used as a time reference for processing the following pack. In other words, the synchronization pattern fulfills the function of the TV line sync signal in the system described in the U.S. Pat. No. 4,058,830. The "byte sync" byte cannot alone constitute the synchronization pattern because it might be confused with another byte of the data field or of the pack prefix.

The confusion of the "byte sync" byte with a byte of the data field is not too troublesome. Indeed as the data usually change from a field to another one, permanent false synchronization would be avoided. Such a confusion with a byte belonging to the pack prefix can entirely disturb the communication. As a matter of fact, in a pack, prefix data are changed much less than in the following field of data, particularly in the case of a multiplex comprising no more than one or a few digital channels. With a sequence of two bytes of the Hamming code, it would be sufficient to independently select the last four bits of the first byte and the first four bits of the second byte to rebuild the "byte sync" byte. Certain configurations of identifiers X, Y, Z cause false synchronizations which may be stable.

According to this invention, instead of the "byte sync" byte alone, use is made of a sequence of 16 bits comprising the "bit sync" byte, or at least the last one, with the ∓byte sync" byte. In order to preclude false synchronizations on bytes of the packet bytes, every configuration of triplets of compatible synchronization patterns represented in hexadecimal notation by E7, 21, B4 and E7, 2D, 84 have been examined. Each synchronization pattern made of 10101010 followed by the "byte sync" byte has successively been compared with the first 16 configurations obtained by shifting the sequence of 32 bits composed of:

the last three "byte sync" byte bits, in direct order and in reverse order, sixteen configurations for each of the following three bytes belonging to the Hamming code, i.e. in hexadecimal: A8, 40, 92, 7A, 26, CE, 1C, F4, OB, E3, 31, D9, 85, 6D, BF, 57, five bits randomly selected in order to complete the 32 configurations.

The hereafter included table lists the sequences which might result in at least one identity with the searched sequence. No identity has been found for bytes B4 and 2D.

A byte cannot be used in the syncronization pattern if there is at least one identity with the last byte nil. Indeed, in that case, an identity is encountered in the first three bytes and the utilization of some address configurations may cause a false transmission block synchronization.

Thus bytes 21 and 84 cannot be used. On the opposite bytes E7, as in the U.S. Pat. No. 4,058,830, plus B4 and 2D can be used. Associated with the "bit sync" byte, they can be used as synchronization patterns.

In some types of demodulators, as differential or coherent demodulators, a sign ambiguity systematically occurs in the demodulated signal. In known systems, ambiguity is removable by using a specific encoding. According to a feature of this invention, removing sign ambiguity is performed by detecting the sign of the "byte sync" byte and by using the detection result, either for reversing or not reversing the data polarities in the receiver.

According to another feature, in a data pack receiver used in the system according to this invention, there is a memory for storing the synchronization pattern. A shift register is capable of storing two successive bytes, the demodulated binary signals being applied to the said shift register serial input. A comparator whose first inputs are connected from the said memory outputs and second inputs are connected from the shift register parallel outputs.

| E7 | | 21 | | 84 | |
| --- | --- | --- | --- | --- | --- |
| DIRECT | INVERSE | DIRECT | INVERSE | DIRECT | INVERSE |
| A8855738 | A8855738 | 92A88500 | A885A800 | A87AA840 | A87AA840 |
| A86D5738 | A86D5738 | 7AA88500 | A8854000 | 407AA840 | 407AA840 |
| 40855738 | 40855738 | 26A88500 | A8859200 | 927AA840 | 927AA840 |
| 406D5738 | 406D5738 | CEA88500 | A8857A00 | 7AA84000 | 7AA84000 |
| 92855738 | 92855738 | | A8852600 | 7A7AA840 | 7A7AA840 |
| 926D5738 | 926D5738 | | A885CE00 | 267AA840 | 267AA840 |
| 7A855738 | 7A855738 | | A8851000 | CE7AA840 | CE7AA840 |
| 7A6D5738 | 7A6D5738 | | A885F400 | 1C7AA840 | 1C7AA840 |
| 26855738 | 26855738 | | A885 B00 | F47AA840 | F47AA840 |
| 266D5738 | 266D5738 | | A885E300 | B7AA840 | B7AA840 |
| CE855738 | CE855738 | | A8853100 | E37AA840 | E37AA840 |
| CE6D5738 | CE6D5738 | | A885D900 | 317AA840 | 317AA840 |

-continued

| E7 | | 21 | | 84 | |
| DIRECT | INVERSE | DIRECT | INVERSE | DIRECT | INVERSE |
| --- | --- | --- | --- | --- | --- |
| 1C855738 | 1C855738 | | A8858500 | D97AA840 | D97AA840 |
| 1C6D5738 | 1C6D5738 | | A8856D00 | 857AA840 | 857AA840 |
| F4855738 | F4855738 | | A885BF00 | 6D7AA840 | 6D7AA840 |
| F46D5738 | F46D5738 | | A8855700 | BF7AA840 | BF7AA840 |
| B855738 | B855738 | | 92A88500 | 577AA840 | 577AA840 |
| B6D5738 | B6D5738 | | 7AA88500 | | |
| E3855738 | E3855738 | | 26A88500 | | |
| E36D5738 | E36D5738 | | CEA88500 | | |
| 31855738 | 31855738 | | | | |
| 316D5738 | 316D5738 | | | | |
| D9855738 | D9855738 | | | | |
| D96D5738 | D96D5738 | | | | |
| 85855738 | 85855738 | | | | |
| 856D5738 | 856D5738 | | | | |
| 6D855738 | 6D855738 | | | | |
| 6D6D5738 | 6D6D5738 | | | | |
| BF855738 | BF855738 | | | | |
| BF6D5738 | BF6D5738 | | | | |
| 57855738 | 57855738 | | | | |
| 576D5738 | 576D5738 | | | | |

The comparator output is connected to the first input of an OR gate, a first counter having a capacity of (I-1) bit, whose clock input is connected from the demodulator bit clock and overflow output is connected, on the one hand, to the second input of the OR gate and, on the other hand, to the initialization input of a second counter having a capacity of about two bytes whose clock input is connected from comparator enable input. An output of the OR gate is connected to the initialization input of the first counter. The output of the second counter delivers a validation signal for the transmission block.

According to another feature, the memory is comprised of a first and a second memory. The comparator is comprised of a first and a second comparator. The shift register is comprised of a first one-byte shift register serially connected to a second one-byte shift register. The first memory stores byte 10101010 and the second memory stores the "byte sync" byte. The receiver also comprises a third comparator having first inputs which are are connected from outputs of the first memory through inverters and second outputs connected from the first shift register. The enable input of the third comparator is connected from the second counter output. The outputs of the first and second comparators are connected to the inputs of an AND gate whose output is connected to the first input of the OR gate. The third comparator output is connected to the input of an inverting circuit for inverting the polarities of the received bits. The inverting circuit output is connected to the serial input of the first shift register.

In addition, it has been learned that, when transmitting data packs on a carrier, errors may occur at the demodulation end when the data to be transmitted has a peculiar structure, such as for instance in the case of no binary transition, or for sequences of data causing consecutive phase shifts of 90°, or for periodic binary configurations, and so on. Indeed in those cases, the spectrum of the transmitted signal does not uniformly cover the transmission channel frequency band, but is a line spectrum which disturbs the carrier restoration, because the restoration circuits tend to tune on a line, than on another line, and so on.

The French technical book TELEINFORMATIQUE by C. Macchi and J.-F. Guilbert, published by Dunod in 1979, pages 55 and 56, paragraph "Brouillage" (Scrambling) teaches the transmission of line spectrum signal to perform, at the transmitting end, a modulo-2 addition of the binary data train and a pseudo-random sequence and, at the receiving end, to perform a second modulo-2 addition of the received train and a pseudo-random sequence identical to the first one.

In the following description, that modulo-2 addition will be called a data scrambling operation, when it is performed at the transmitting end, and a data descrambling operation, when it is performed at the receiving end.

According to another feature, a data scrambling is performed in each transmission block, the synchronization pattern being excluded. A data descrambling is performed in the same conditions, the pseudo-random sequences being, at both transmitting and receiving ends. The scrambling sequences are generated by identical random sequence generators, the receiver random sequence generator being triggered as soon as each synchronization pattern has been recognized in each transmission block.

Figure 2:
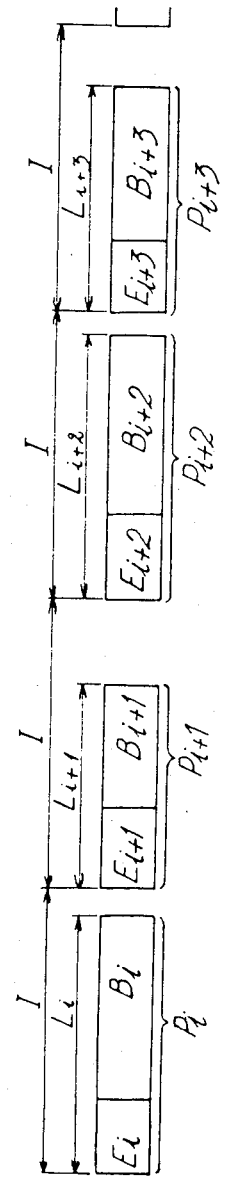
Figure 3:
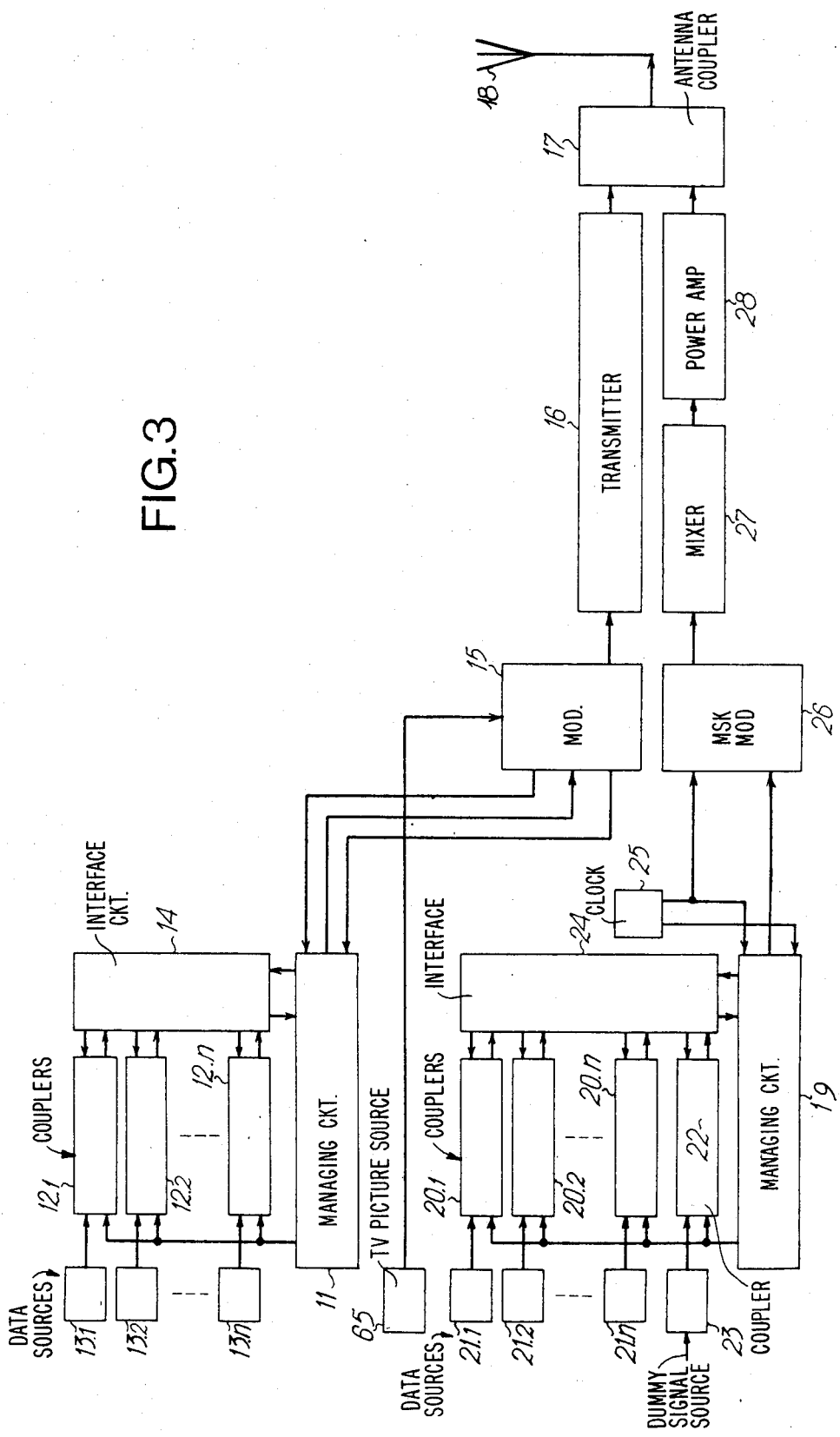
Figure 4:
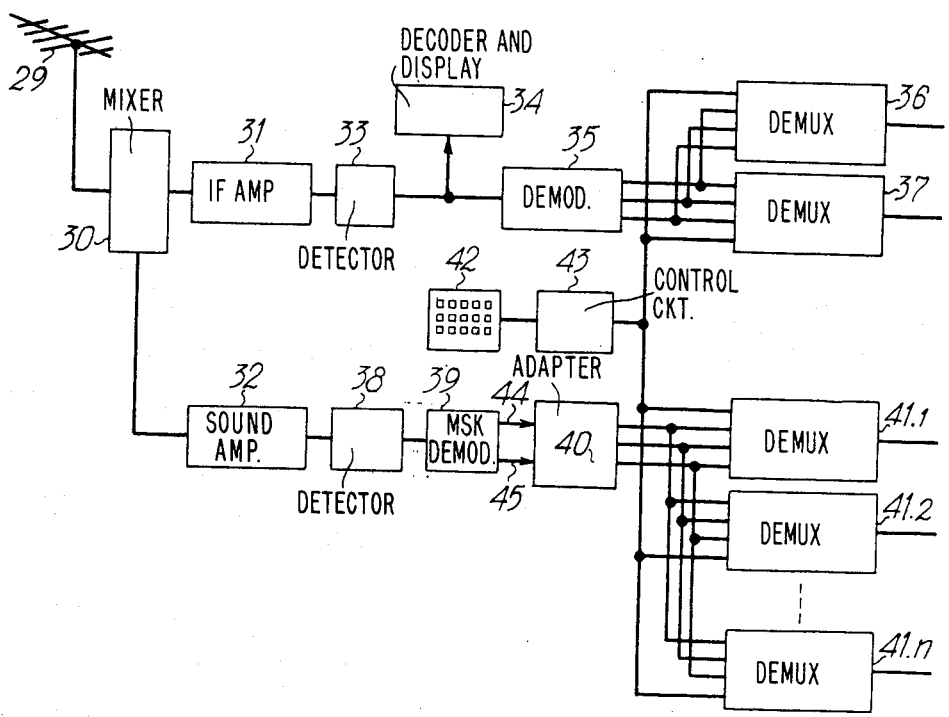
Figure 7:
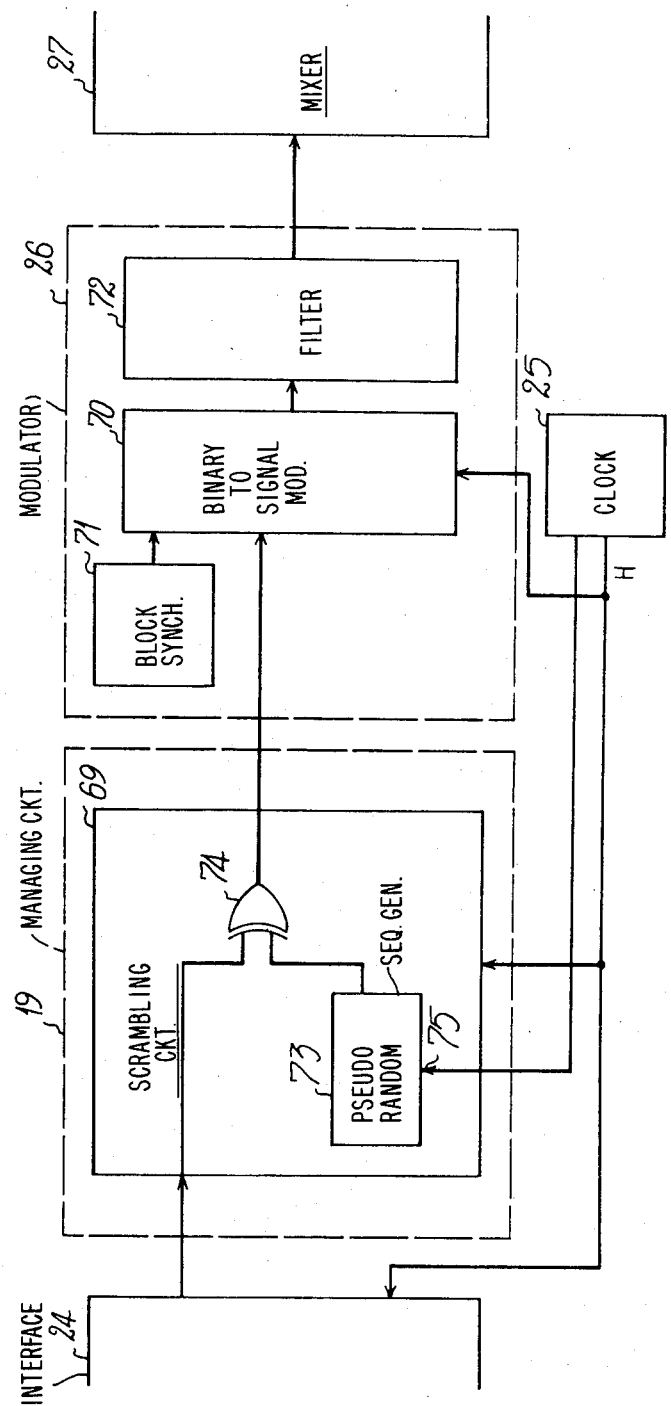
Figure 8:
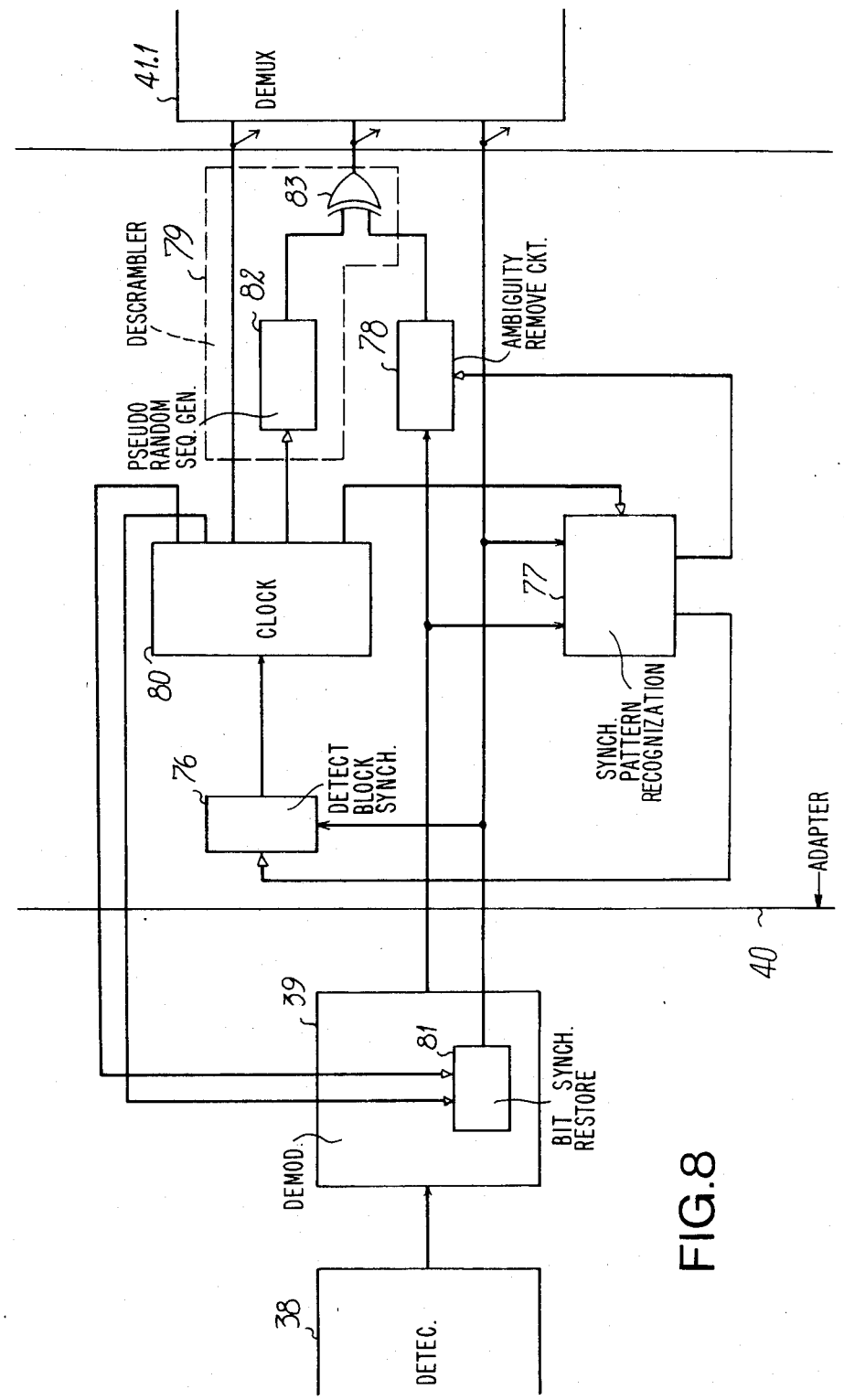
Figure 9:
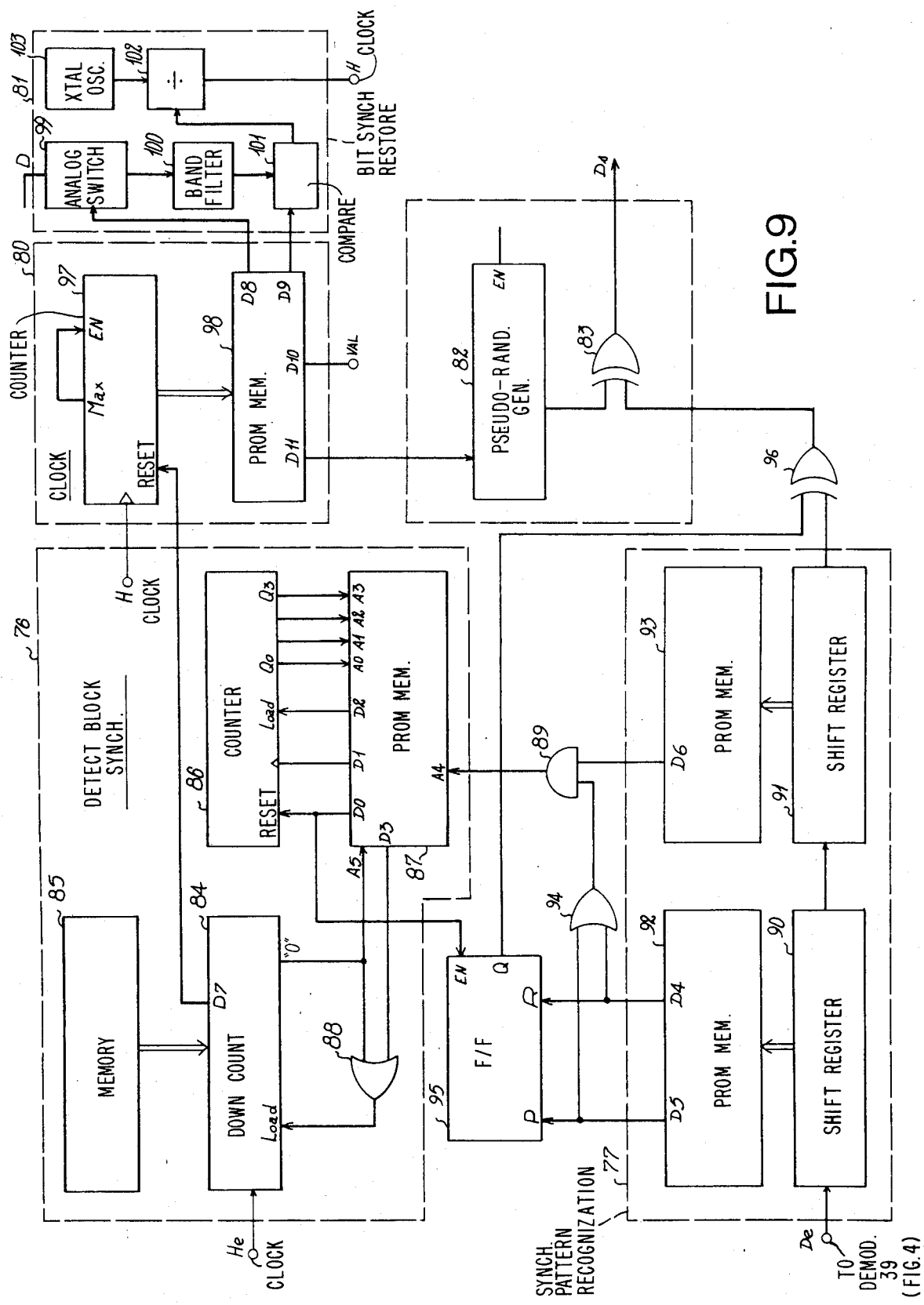
Figure 10:
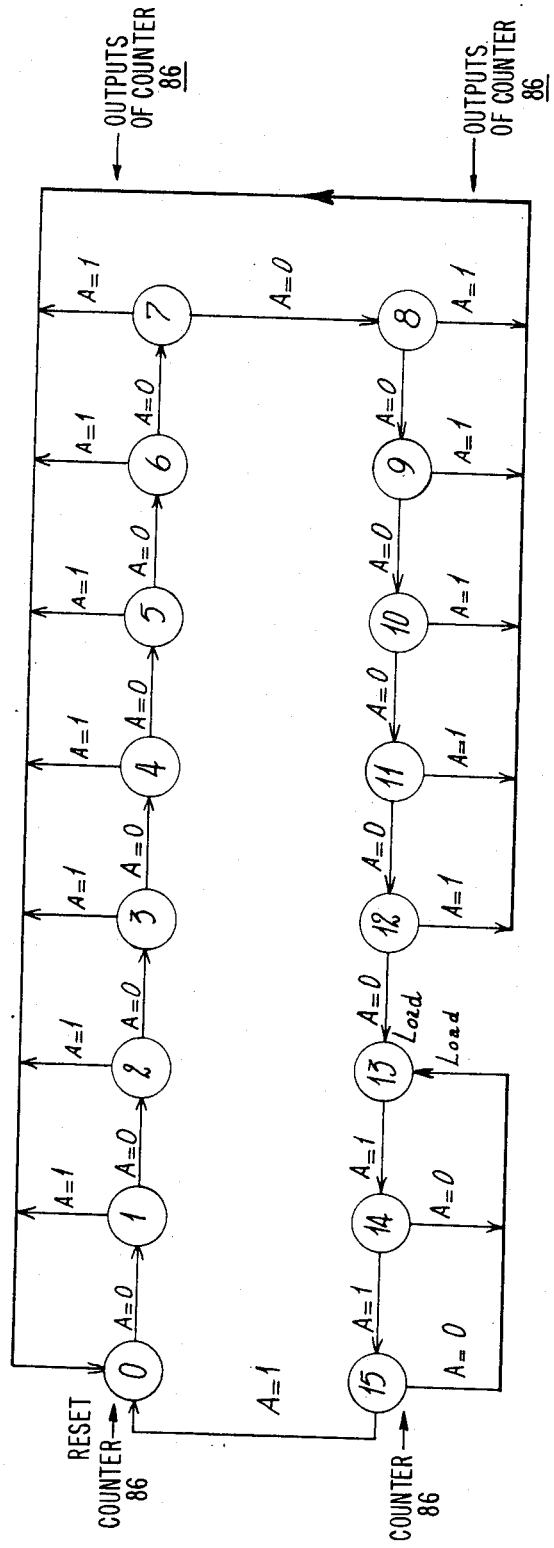

The above mentioned features of this invention, as well as others, will appear more clearly from the following description of embodiments, the description being made in conjunction with the accompanying drawings, wherein:

FIG. 1 is a schematic diagram showing a sequence of packs, according to the known system of the U.S. Pat. No. 4,058,830, FIG. 2 is a schematic diagram showing a sequence of transmission blocks according to this invention, FIG. 3 is a block-diagram of a transmission equipment for use in the system according to this invention, and associated with the known system of the U.S. Pat. No. 4,058,830, FIG. 4 is a block-diagram of a reception equipment for use in the system according to this invention, and associated with the known system of the U.S. Pat. No. 4,058,830, FIG. 5 is a diagram of the adapter used in the reception equipment shown in FIG. 4, FIG. 6 shows waveforms illustrating the operation of the adapter shown in FIG. 5, FIGS. 7 and 8 are block-diagrams of alternatives of the transmission and reception equipments respectively shown in FIGS. 3 and 4, FIG. 9 is the diagram of an embodiment of the adapter used in the reception equipment shown in FIG. 8, and FIG. 10 is a schematic diagrm illustrating the operation of the adapter shown in FIG. 9.

The attached FIG. 1 shows a sequence of data packs P1–P4, . . . , which are the same as the packs described in the U.S. Pat. No. 4,058,830. Each of the inventive packs pi (FIG. 2) includes a pack prefix Ekj and a field of data Dkj, with i indicating the number of the pack broadcasted through the system, k indicating the number of the data source originating the data pack and j indicating the number of the pack transmitted from the concerned data source. In eack pack prefix and each data field, data are assembled in bytes or octets. The pack prefix comprises the first eight bytes of the pack and the data field may include up to 32 bytes, that is a maximum, as far as the French TV standards are concerned.

Within the pack prefix, the first two bytes 1 and 2 are used for the "bit" synchronization and each are composed of the bit sequence 10101010; byte 3 is used for the "byte" synchronization and may correspond to the bit sequence 11100111; bytes 4, 5, and 6 are alloted to the service identification, that is the source identification; byte 7 indicates the pack index and permits a recognization in the receiver equipment of whether or not a pack has been lost; finally, byte 8 indicates the data field format, i.e. the length of the data field expressed by the number of the last byte having a meaning.

Each pack shown in FIG. 1 is carried on a TV picture line, in a TV channel. Packs may be transmitted on any TV channel picture line or in only some of them, in a well known manner.

The transmission equipment shown in FIG. 3 comprises a "managing" unit 11, a plurality of couplers 12.1-12.n supplied with data from a plurality of data sources 13.1-13.n, an interface 14, a modulator circuit 15, a transmitter 16, an antenna coupler 17 and an antenna 18. All those circuits may be entirely identical to those described in FIGS. 3 and 4 of U.S. Pat. No. 4,058,830.

The equipment shown in FIG. 3 still comprises a second "managing" unit 19, a plurality of couplers 20.1-20.n supplied with data from a plurality of data sources 21.1-21.n, a coupler 22 connected to a source 23, an interface 24, a time base 25, a modulator 26, a frequency mixer 27, and a power amplifier 28 whose output is connected to the input of coupler 17.

The modulation performed in modulator 26 is a MSK modulation and the modulator may of the type described in the French patent application No. 78 17419 filed on June 6, 1978 (and published under the U.S. Pat. No. 2,428,345) and entitled "Modulator for coherent phase shift modulation of indicia ½ with continuity of the modulated signal phase". The carrier frequency may of about 10 MHz. The carrier is transposed at the transmission of the transmitter 16 in the mixer 27 and amplified in the power amplifier 28.

Circuits 26, 27 and 28 are considered as being well known and will not hereafter further described.

The modulator 15 has one input connected from a TV picture signal source 65.

Source 23 is a dummy signal generator. It is constituted by a memory that stores a constant sequence of bits which fits with the utilized modulation to make it easier to restore the bit clock.

Time base generator 25 delivers bit clock pulses through managing circuit 19 and interface 24 to the couplers 20.1-20.n, and to modulator 26. In addition it delivers the periodic block starting signal of period I to the managing circuit.

The reception equipment shown in FIG. 4 comprises an antenna 29 connected to the input of a frequency mixer 30 having two outputs, one output being connected to the input of a IF amplifier 31 and the the other one being connected to the input of a sound amplifier 32. The output of amplifier 31 is connected to the input of a detector 33 whose video output is connected, on the one hand, to a decoder and display circuit 34, and, on the other hand, to a demodulator 35 whose output is parallel connected to inputs of demultiplexers 36 and 37. The demodulator 35 and demultiplexers 36 and 37 altogether form a reception equipment as described in the U.S. Pat. No. 4,058,830. Demultiplexers 36 and 37 may be associated with units, not shown, such as ANTIOPE teletext terminals.

The output of amplifier 32 is connected to the input of a detector 38 whose sound output is connected to the input of a digital demodulator 39, which delivers the restored bit clock and the data.

Output of demodulator 39 is connected to the input of an adapter 40 whose output is parallel connected to corresponding inputs of demultiplexers 41.4-41.n which also may be associated to ANTIOPE teletext terminals, or sound terminals.

The reception equipment shown in FIG. 4 further comprises a key board 42, which is available to the user, whose output is connected to the input of a control circuit 43 whose output is connected to control inputs of demultiplexers 36, 36 and 41.1-41.n.

Practically, MSK signal demodulator 39 has two outputs 44 and 45, output 44 delivering the bit clock pulse train and output 45 delivering the train of binary data. As shown in the detailed diagram of FIG. 5, the output 44 of demodulator 39 is parallel connected to the clock inputs of two down-counters 46 and 47. Output "O" of down-counter 46 is connected, on the one hand, to the load input of down-counter 47 and, on the other hand, to one input of a two-input OR gate 48. The parallel inputs of down-counter 46 are connected from the parallel outputs of a memory 49 storing the digital value of the period I, less one. Parallel inputs of down-counter 47 are connected from parallel outputs of a memory 50 storing the value of n pulses. Output "O" of down-counter 47 is connected to the input of an inverter 51 whose output is connected, on the one hand, through wire 52 to the enable inputs of demultiplexers 41.1-41.n and, on the other hand, to the enable inputs of comparators 53, 54 and 55.

Output 45 of demodulator 39 is connected to one input of an exclusive-OR gate 56 whose output is connected to the input of a shift register 57 whose output is connected to the input of a shift register 58 whose output is parallel connected through wire 59 to data inputs of demultiplexers 41.1 to 41.n. Shift registers 57 and 58 are both byte registers. The eight parallel outputs of shift register 58 are connected to the first eight parallel inputs of comparator 53. The eight parallel outputs of shift register 57 are respectively connected to the first eight parallel inputs of comparators 54 and 55. The second eight inputs of comparator 53 are connected from outputs of a byte memory 60. The second eight inputs of comparator 54 are connected from the output of a byte memory 61 and the second eight outputs of comparator 55 are respectively connected from the outputs of eight inverters 62 whose inputs are respectively connected from outputs of byte memory 61.

The output of comparator 53 is connected to one input of a two-input AND gate 63 whose the other input is connected from output of comparator 54 and output is connected to the second input of OR gate 48. The output of comparator 55 is connected to input "H" (clock input) of a D flip-flop 64 whose output Q is connected to the second input exclusive-OR gate 56 and output $\overline{Q}$ is connected to its input "D".

The output of OR gate 48 is connected to a load control input of down-counter 46.

Assuming that the value of the block transmission period is I clock pulses, down-counter 46 is designed to cyclically count from (I-1) down to zero, unless it is earlier reloaded by output of OR gate 48.

Down-counter 47 is as designed as to cyclically count down n pulses, i.e. $2^2$ pulses, for instance.

In FIG. 6, there is shown the waveform A of the output signal from inverter 51 which constitutes the validation signal VAL. Indeed, the output of down-counter 47 is at level "1" as long as that counter is counting down, which means that width of signal VAL is of n pulses. Waveform B is the output signal from down-countr 46 is ahead with respect to the beginning of each period, since down-counter 46 counts (I-1) pulses only. Waveform C represents the output signal from AND gate 63. Output signal C is delivered when the respective outputs of comparators 53 and 54 are coinciding, which means a positive comparison that occurs when the two bytes of the synchronization pattern are simultaneously recognized in comparators 53 and 54. As a result, when a synchronization pattern has been recognized just after signal B, down-counter 46 is again reset. Thus, when synchronization is normally present, down-counter 46 delivers every I pulses an output signal to down counter 47.

In FIG. 6, waveform D represents the signal VAL delivered at the period which follows the transmission of signal A, assuming that the synchronization pattern has been correctly recognized. Thus waveform D is identical to signal A. It will now be assumed that during the next period the expected coincidence in comparators 53 and 54 does not occur. Then waveform E shows that the next signal VAL is still ahead by one pulse with respect to signal A. Waveforms F and G illustrate the condition when the synchronization pattern had not already been recognized at the preceding transmission block, which causes a shift ahead by one pulse at each period. If the coincidence occurs before signal VAL has been shifted ahead by n pulses, the condition of signals A, B and C is restored. If not, it occurs at the end of a transmission block.

It is possible to demonstrate that the width n of the strobe signal VAL may be determined as a function of a given probability of an out-of-synchronization condition within a predetermined time duration.

When the byte corresponding to the "byte sync" byte appears in the shift register 57, but with a reverse polarity, while signal VAL is delivered from counter 47, through inverter 51, comparator 55 delivers a positive comparison signal that is applied to the input "H" (clock input) of flip-flop 64 whose output Q condition changes. As a result, there is a change of polarity at the output of exclusive-OR gate 56. That polarity change enables an expected positive comparison at the beginning of the next period.

In the adapter shown in FIG. 5, as far as the functions are concerned, there are a circuit 66 intended for picking up the transmission block synchronization and operating as a digital lock loop, a circuit 67 intended for reading synchronization patterns of transmission blocks, and an ambiguity removing circuit 68. Circuit 66 comprises down-counters 46 and 47, OR gate 48, memories 49 and 50, and inverter 51. Circuit 67 comprises comparators 53 and 54, shift registers 57 and 58, memories 60 and 61, and AND gate 63. Circuit 68 comprises comparator 55, inverter 62, flip-flop 64 and exclusive-OR gate 56.

In the transmission equipment shown in FIG. 3, it is implicitly assumed that the rough packets delivered from couplers 20.1-20.n and 22 were transmitted without modification through the managing circuit 18 to the modulator 26 wherein the transmission block synchronization pattern was inserted in front of each pack. In FIG. 7, there is shown an alternative of that transmission equipment wherein there is provided within the managing circuit 19 a scrambling circuit 69 performing a binary scrambling, the data input of which is connected from data output of interface 24 and the data output of which is connected to the data input of a binary-to-signal modulation circuit 70 of the modulator 26. Another input of circuit 70 is connected from the output of a circuit 71 which periodically delivers the synchronization for each transmission block. The output of modulation circuit 70 is connected to the input of a filter circuit 72 for reducing the power spectrum, the output of which is connected to the frequency mixer 27. The time base 25 delivers the clock signals needed to control and operate all those circuits. Indeed the scrambling circuit 69 comprises a pseudo-random sequence generator 73 and an exclusive-OR gate 74 whose one input is connected from output of interface 24 and the other input of which is connected from the output of pseudo-random sequence generator 73 and whose output is connected to the corresponding input of modulator circuit 70. The pseudo-random sequence generator 73 operates with a polynomial $(x^9+x^4+1)$ and delivers a longer sequence than pack length. The generator 73 has a triggering input 75 that is connected to a corresponding output of the time base 25.

The reception equipment shown in FIG. 8 is provided for receiving transmission blocks processed by the circuits shown in FIG. 7. It still includes the detector 38, demodulator 39, adapter 40 and demultiplexers 41.1-41.n. However in this embodiment, the adapter 40 includes a circuit 76 provided for picking up the transmission block synchronization and operating a digital closed loop, a circuit 77 intended for reading synchronization patterns of transmission blocks, an ambiguity removing circuit 78, a descrambling circuit 79 and a time base 80. Within demodulator 39, there is also shown a circuit 81 used for restoring the bit synchronization. The descrambling circuit 79 includes a pseudo-random sequence generator 82, identical to the generator shown in FIG. 7, and an exclusive-OR gate 83 whose one input is connected from output of pseudo-random sequence generator 82 and the other input is connected from output of ambiguity removing circuit 78 and whose output delivers the data packs to the said demultiplexers.

The adapter 40 and the circuit 81 are shown with more details in FIG. 9. The circuit 76 includes a synchronous down-counter 84, a memory 85, a four-stage binary counter 86, a PROM memory 87 and an OR gate 88. The memory stores the length N of the transmission blocks, that is the number of bits in each pack, plus the synchronization pattern, plus a predetermined number of bits filling the gap between the end of the pack and the next synchronization pattern. In the described embodiment, that predetermined gap corresponds to one bit, but may be changed. The memory 85 is obviously changeable if the transmission system is modified in this respect. The output of memory 85 is connected to the load input of down-counter 84. Output "O" of down-counter 84 is connected to one input of an OR gate 88 whose output is connected to the load enable input of down-counter 84. Output "0" of counter 84 is also connected to an address input A5 of PROM memory 87. The clock input of down-counter 84 is connected from bit clock output H of circuit 81.

Binary counter 86 has its four outputs Q0–Q3 respectively connected to four address inputs A0–A3 of PROM memory 87. Three outputs D0–D2 of PROM memory 87 are respectively connected to the reset input, clock input and load input CH of counter 86. A fourth output D3 of PROM memory 87 is connected to the second input of OR gate 88. Finally input A4 of PROM memory 87 is connected from the output of an AND gate 89, in circuit 77.

The operation of the digital lock loop 76 will be hereafter described in conjunction with the organigram shown in FIG. 10, wherein the contents of the circles correspond to the conditions of counter 86 and the variable A is defined as follows:
for each condition "0"–"12" and "14" and "15", the value of A is that of A4, when A5 is at level "1", and
for condition "13", the value of A is that of A4, irrespective of the value of A5.

Input A4 is at level "1" each time the synchronization pattern or the reciprocal thereof is recognized in circuit 77 while input A5 is at "1" for each zero crossing of down-counter 84.

Condition "0" of counter 86 corresponds to a correct synchronous operation with A4 and A5 conditions simultaneously being "1" at each beginning of each transmission block. Assuming that, when A5 is "1", A4 is no longer "1", i.e. A=0, a clock pulse is delivered from output D1 of counter PROM 87 to clock input of 86 which changes to condition "1". At the next period of down-counter 84, when A5 is "1", if A4 is "1", output D0 of PROM memory 87 resets counter 86, but if A4 is "0" again, output D1 delivers another pulse which causes counter 86 to change to condition "2", and so on, up to the time when either counter 86 reaches condition "12" or is reset to "0". When count "12" has been reached in counter 86 and when A5 is "1", A4 is "1", counter 86 is reset, but if A4 is "0", output D2 delivers a load signal to counter 86 which is set to condition "13". Synchronization is considered as being lost and the digital lock loop starts to operate in search mode. From that time, each time input A4 is at level "1", irrespective of the condition at A5, PROM 87 causes counter 86 to step to condition "14" and, through D3, causes down-counter 84 to be loaded. In condition "14", when A5 is "1", if A4 is "O", PROM 87 reloads counter 86 at "13", but if A4 is also "1", it causes counter 86 to step to "15". At the next period, counter 86 steps to "0" or is reloaded down to "13", as shown in the organigram.

Circuit 77 includes two serially connected shift registers 90 and 91, and two PROM memories 92 and 93, as well as an OR gate 94 and an AND gate 89.

Shift register 90 has its serial input connected from digital data output of demodulator 39 and its serial output connected to the serial input of shift register 91. Parallel outputs of shift register 90 are connected to address inputs of PROM memory 92, while parallel outputs of shift register 91 are connected to address inputs of PROM memory 93. PROM memory 92 has two outputs D4 and D5 which are respectively at level "1" depending on the byte being in shift register 90 which either directly corresponds to the "byte synchronization" byte or the reverse thereof. PROM memory 93 has an output D6 which is at level "1" for both of the cases of the byte being in shift register 91 and corresponding to the "bit synchronization" byte and its reverse. Outputs D4 and D5 are respectively connected to the two inputs of OR gate 94 whose output is connected to one input of AND gate 89. Output D6 of PROM memory 93 is connected to the other input of AND gate 89.

The ambiguity removing circuit 78 includes a flip-flop 95 and an exclusive OR gate 96. Flip-flop 95 is a RS-type flip-flop whose input R is connected from output D4 of PROM memory 92 while input P is connected from output D5 of PROM memory 92. Enable input EN of flip-flop 95 is connected from output D0 of PROM memory 87, in the detection of block synchronization 76, and its output Q is connected to one input of exclusive-OR gate 96, the other input of which is connected from serial output of shift register 91.

When the two bytes of the synchronization pattern are respectively being in shift registers 90 and 91, respective outputs D6 and D4 of PROM memories 93 and 92 are at level "1". Thus, the output of OR gate 94 and output of AND gate 89 are at level "1", which results in A4=1. If the byte corresponding to the "byte synchronization" byte, but with a reverse polarity, appears in shift register 90, while the reverse of the "bit synchronization" byte is in shift register 91, outputs D6 and D5 of 93 and 92 change to level "1", which again results in A4=1. In addition, input P of flip-flop 95 is "1", so that output Q of flip-flop 95 changes its condition, when output D0 of counter 86, connected to input EN of 95 is at level "1", i.e. at the beginning of a transmission block. As a result, there is a polarity reversal at the output of exclusive-OR gate 96. Such a polarity reversal enables an expected positive comparison at the beginning of the next period.

Time base or clock circuit 80 includes an eight-stage binary counter 97 and a PROM memory 98. The clock input H of counter 97 is connected from bit clock output H of circuit 81. The reset input of counter 97 is connected from a predetermined output D7 of down-counter 84. Parallel outputs of counter 97 are connected to address inputs of PROM memory 98. In a preferred embodiment, output D7 of down counter 84 corresponds to count "40". Thus, counter 97 is reset five bytes before the end of each block. That number of five bytes could be reduced to three or increased to some other number; however, five seems seems reasonable. Output MAX of counter 97 is connected to its input EN to stop the counting as soon as it has reached 256 bits, since it is useful only at the beginning of each transmission block.

PROM memory 98 has two outputs D8 and D9 connected to circuit 81, an output D10 connected to the wire VAL and an output D11 connected to the triggering input of the pseudo-random sequence generator 82.

The bit clock restoration circuit 81 includes an analog switch 99 whose data input is connected to output of detector 38 and output is connected to input of a narrow band one-pole filter 100. Output of filter 100 is connected to the first input of a comparator 101 whose second input is connected from output D9 of PROM memory 98. The output of comparator 101 is connected to the phase set input of a frequency divider 102 whose signal input is connected from a crystal controlled oscillator 103. The frequency of oscillator 103 is n times the bit frequency. Comparator 101 may be an operational amplifier one input of which is connected from output of filter 100 and the other input is connected from D9. Output D9 applies all the time a blocking potential to comparator 101, save during a short duration which corresponds to the last bits of the "bit sync" byte of the synchronization pattern of each transmission block, that is when the envelope of the signal delivered from filter 100 should have exceeded a predetermined threshold. Output signal from comparator 101 thus is a strobe for frequency divider 102 which is loaded during the strobe as soon as the first zero-crossing of the output signal of filter 100 has occured, which provides the phasing.

Moreover, filter 100 must be quiet during the useful portion of the pack so as to do not disturb its response when the "bit sync" burst occurs. Therefore the analog switch 99 has its control input connected from output D8 of PROM memory 98, that output D8 being at level "1" only a few bits before the end of a pack.

Output D11 is at level "1" at a predetermined time after the beginning of a block so as to trigger the pseudo-radom sequence generator 82 which must start to deliver its sequence on the time the 17th bit of occurs at the corresponding input of exclusive-OR gate 83. Output D10 is at level "1" at a predetermined time so as to deliver the signal VAL to the demultiplexers. The divider 102 delivers the bit clock on wire H.

Of course, the program of PROM memory 98 enables a selection those predetermined times for enabling outputs D8–D11 so as to obtain the most efficient operation.

What is claimed is:

1. A system for transmitting digital data packs comprising transmitter means for periodically transmitting blocks of data during successive periods, each block including a plurality of data packs, each of the periods for transmitting said blocks of data containing a predetermined number of clock pulses which define a period which is at least as long as a block of data, means for filling each of said periods for transmitting said blocks of data with dummy packs if said period is not otherwise filled with said digital packs, means for indicating the beginning of each of said transmission blocks of data by a distinctive synchronization pattern of pulses including a bit synchronization pulse followed by a byte synchronization pulse, at least one data pack receiver means including memory means for storing the synchronization pattern; shift register means for storing two successive bytes; demodulator means including a clock means for demodulating said block of data signals and for applying the demodulating signals to the signal input of said shift register means; comparator means having first inputs connected to the output of said memory means and second inputs connected in parallel to the output of said shift register means; OR gate means having a first input connected to an output of said comparator means; first and second counter means; said first counter means having a capacity of one less than said predetermined number of bits, having a clock pulse input which is connected to the demodulator clock means, and having an overflow output connected to a second input of said OR gate means and to an initialization input of said second counter means; said second counter means having a capacity of two bytes having a clock pulse input connected from a comparator means enable input; the utput of the OR gate means being connected to an initjalization input of the first counter means, and the output of the second counter means delivering a validation signal for the transmission block of data.

2. The digital data pack transmission system according to claim 1, wherein the said memory means is comprised of first and second memory means, said comparator means is comprised of first and second comparator means, and the shift register means is comprised of a first one-byte shift register means serially connected to a second one-byte shift register means, the first memory means storing byte 10101010 and the second memory means storing the "byte sync" byte, said receiver means also comprising third comparator means having first inputs connected to outputs of the first memory means via inverters and second outputs connected to the first shift register means, an enable input of the third comparator means being connected to the output of the second counter means, AND gate means outputs of the first and second comparator means being connected to the inputs of said AND gate means having an output connected to the first input of the OR gate means, the third comparator means having an output connected to the input of an inverting circuit means for inverting the polarities of the received bits, and the inverting circuit means having an output connected to the signal input of the first shift register means.

3. A digital data pack transmission system according to claim 1, wherein the "bit sync" byte is 10101010 and the "byte sync" byte is B4 or 2D in hexadecimal notation.

4. A system for transmitting digital data packs comprising transmitter means for periodically transmitting blocks of data during successive periods, each block including a plurality of data packs, each of the periods for transmitting said blocks of data containing a predetermined number of clock pulses which define a period which is at least as long as a block of data, means for filling each of said periods for transmitting said blocks of data with dummy packs if said period is not otherwise illed with said digital packs, means for indicating the beginning of each of said transmission blocks of data by a distinctive synchronization pattern of pulses including a bit synchronization pulse followed by a byte synchronization pulse, data scambling means in the transmitter means for scrambling the signals in each block of data prior to the transmission thereof, said scrambling excluding the synchronization pattern, receiver means for receiving said transmitted data, data descrambling means in the receiver means for descrambling the receiver signals for restoring the blocks of data to the same conditions that they had prior to the start of said transmission, means for generating pseudo-random sequences at both the transmitting and receiving ends of said system, the pseudo-random sequences being generated by identical random sequence generator means, the receiver pseudo-random sequence generator means being triggered responsive to each recognition of the synchronization pattern of signals in each transmission of a block of data signals.

5. A digital data pack transmission system according to claim 4, wherein the "bit sync" byte is 10101010 and the "byte sync" byte is B4 or 2D in hexadecimal notation.

6. A system for transmitting digital data packs comprising transmitter means for periodically transmitting blocks of data during successive periods, each block including a plurality of data packs, each of the periods for transmitting said blocks of data containing a predetermined number of clock pulses which define a period which is at least as long as a block of data, means for filling each of said periods for transmitting said blocks of data with dummy packs if said period is not otherwise filled with said digital packs, means for indicating the beginning of each of said transmission blocks of data by a distinctive synchronization pattern of pulses including a bit synchronization pulse followed by a byte synchronization pulse, data pack receiver means for receiving said transmitted data wherein each of said data pack receiver means includes two control PROM memory means having address inputs and being associated with two serially connected shift register means for storing data derived from said received data, said shift register means having parallel outputs respectively connected to address inputs of said two associated control PROM memory means, two outputs of the two PROM memory means being respectively connected to the inputs of said AND gate, third PROM memory means having address inputs, an output of said AND gate being connected to an address input of said third PROM memory means, binary $2^p$-stage counter means, OR gate means having at least two inputs, said third control PROM memory means having a first set of outputs respectively connected to reset, clock and load inputs of said binary $2^p$-stage counter means, a second output of said third PROM memory being connected to a first input of said OR gate, the outputs of the binary $2^2$-stage counter being connected to corresponding address inputs of said third PROM memory means, down-counter means having loading inputs, pack length memory means, the output of said OR gate being connected to a load input of said down-counter means, the loading inputs of said down counter means being connected from outputs of said pack length memory, a zero output connected to the second input of the OR gate and to an address input of said third PROM memory means, and base time circuit means, said down-counter having a predetermined output connected to said base time means to deliver a base time validation signal.

7. A digital data pack transmission system according to claim 6, and an exclusive OR gate having at least two inputs, said receiver means further includes pseudo-random sequence generator means having a trigger input connected from an output of said time base means and an output connected to one input of said exclusive OR gate means, and a second input of said exclusive OR gate being connected from a serial output of the second shift register means, said exclusive OR gate having an output which delivers a useful output data pack.

8. A digital data pack transmission system according to claim 7, and a second two input OR gate; a first of the two PROM memory means associated with a first of the shift register means having two outputs which are respectively enabled depending upon the polarity of the "byte sync" byte in the first shift register means; both of said two outputs of said first shift register means being connected to the two inputs of said second OR gate; the output of said second OR gate being connected to an input of said AND gate; a flip-flop having P, R, and an enabling inputs and a Q output, one of said two outputs of said first shift register means being connected to the input R of said flip-flop and the second one of said two outputs being connected to the input P of said flip-flop, the enable input of said flip-flop being connected from an output of said third PROM memory means; and a second exclusive OR gate having at least two inputs, the output Q of said flip-flop being connected to one input of said second exclusive OR gate, a second input of said second exclusive OR gate being connected to a the serial output of said second shift register means and an output of said second exclusive OR gate being connected to a second input of said first exclusive OR gate.

9. A digital data pack transmission system according to claim 6, wherein the "bit sync" byte is 10101010 and the "byte sync" byte is B4 or 2D in hexadecimal notation.

* * * * *